United States Patent [19]

Gotah et al.

[11] Patent Number: 4,546,171

[45] Date of Patent: Oct. 8, 1985

[54] METHOD FOR CONTINUOUS POLYCONDENSATION OF HIGHER ALIPHATIC ω-AMINO ACID PARTICLES

[75] Inventors: Eizo Gotah, Toyohashi; Takeshi Tomishima, Aichi; Tadao Tsutsumi; Yoshiyuki Komuro, both of Nagoya, all of Japan

[73] Assignee: Toray Industries, Inc., Tokyo, Japan

[21] Appl. No.: 525,047

[22] PCT Filed: Nov. 25, 1982

[86] PCT No.: PCT/JP82/00450

§ 371 Date: Jul. 20, 1983

§ 102(e) Date: Jul. 20, 1983

[87] PCT Pub. No.: WO83/01954

PCT Pub. Date: Jun. 9, 1983

[30] Foreign Application Priority Data

Nov. 26, 1981 [JP]  Japan .................................. 56-189717

[51] Int. Cl.$^4$ .............................................. C08G 69/06
[52] U.S. Cl. ..................................... 528/310; 422/131
[58] Field of Search ........................................ 528/310

[56] References Cited

FOREIGN PATENT DOCUMENTS 983966  2/1951  France .
614625  7/1944  United Kingdom ................ 528/335

OTHER PUBLICATIONS

Partial Translation of French Patent 983,966, Gregory et al, 2.51.
Partial Translation of Kogyo Nylon, Nov. 1960, Jiro. Kogyo Nylon, 11.60, p. 50, Jiro.

Primary Examiner—Harold D. Anderson
Attorney, Agent, or Firm—Austin R. Miller

[57] ABSTRACT

A higher aliphatic polyamide is obtained by a method wherein particles of powdered or granular 11-aminoundecanoic acid and/or 12-aminododecanoic acid are enveloped in an inert gas, melted, and then immediately polycondensed by heating.

This method is realized by an apparatus including a melting device for melting the powder or granules and a tubular polycondensation reactor connected to the melting device. The melting device is constituted by a container having an inlet and an outlet for supplying and discharging the powder or granules, respectively, a piston provided vertically in the container, and a melting chamber provided below the piston and incorporating therein a lattice-shaped hotplate.

3 Claims, 3 Drawing Figures

METHOD FOR CONTINUOUS POLYCONDENSATION OF HIGHER ALIPHATIC ω-AMINO ACID PARTICLES

TECHNICAL FIELD

The present invention relates to a method of continuously polycondensing a higher aliphatic ω-amino acid and an apparatus used therefor.

BACKGROUND ART

Polyundecaneamide (nylon 11) and polydodecaneamide (nylon 12) obtained from 11-aminoundecanoic acid and 12-aminododecanoic acid (these raw materials are also called ω-amino acids) have excellent low temperature impact resistance, chemical resistance, etc., and hence are convenient for many industrial uses.

Nylon 11 or nylon 12 made from an ω-amino acid is obtained by suspending particles of a powder of granules of the ω-amino acid in water to form a suspension, heating the suspension to evaporate the water and melt the ω-amino acid, and polycondensing the obtained melted ω-amino acid (British Pat. No. 790,170).

Since this method employs water, a large quantity of heat energy is required to evaporate the water and polymerize the ω-amino acid. Therefore, it has been proposed that the ω-amino acid is polycondensed directly, without water. However, unlike a batch polycondensation method, a continuous polycondensation method has the problem that the polycondensation cannot be smooth and continuous since the ω-amino acid is in the form of particles of a powder or granules, and since the polycondensation reaction takes place immediately after the ω-amino acid has been melted.

Accordingly, in order to turn a higher aliphatic ω-amino acid into a polymer with a reduced quantity of energy, the appearance of such a method and apparatus has been desired for continuously as well as smoothly polycondensing particles of ω-amino acid without suspending them in water. The present invention has been completed in accordance with the above background.

DISCLOSURE OF INVENTION

The method in accordance with the invention comprises:

enveloping particles of a powder or granules of ω-amino acid consisting of 11-aminoundecanoic acid and/or 12-aminododecanoic acid in a gas which is inert with respect to said particles, supplying said particles enveloped in said inert gas to a melting device without providing any liquid with said particles, melting said particles, supplying immediately the obtained melt to a polycondensation reactor, and polycondensing the melted ω-amino acid.

In particular, the supply of the melt to the polycondensation reactor is completed within 20 minutes after the particles start to melt.

In addition, in order to realise this method effectively, the following apparatus is employed: a polycondensation reaction apparatus including two major elements which are a melting device for melting the particles of ω-amino acid consisting of 11-aminoundecanoic acid and/or 12-aminododecanoic acid to obtain a melt, and a tubular polycondensation reactor connected to the melting device without or with passing through ductwork to polycondense the melt immediately. The melting device of this apparatus for continuously polycondensing a higher aliphatic ω-amino acid also has the following elements:

(1) a container having an inlet in its upper part for supplying the powder or granules and frustoconical or pyramid-shaped bottom portion, the truncated portion of which composes an outlet for discharging the particles;
(2) a piston moving substantially vertically along the vertical center line of the outlet; and
(3) a melting chamber for melting the particles which is provided below the outlet and is continuous therewith, which incorporates therein a lattice hotplate, and which has a cross-sectional area equal to or larger than that of the outlet.

BEST MODE FOR CARRYING OUT THE INVENTION

The construction of the apparatus in accordance with the invention will be described first, followed by details of the method of the invention employing the apparatus.

Figure 1:
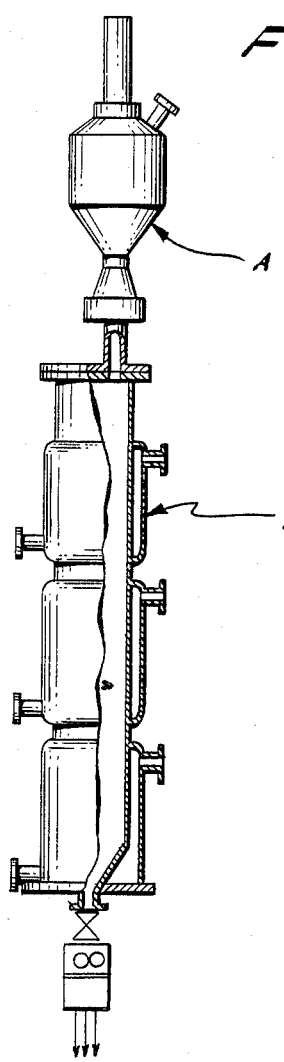
FIG. 1 is a side elevation of the apparatus in accordance with the invention.

The apparatus of the invention comprises two major elements, i.e., a melting device A and a polycondensation reactor B. The melting device A is designed to melt a powder or granules of ω-amino acid consisting of 11-aminoundecanoic acid and/or 12-aminododecanoic acid to obtain a melt. The melting device A comprises elements described below. The polycondensation reactor B is designed to polycondense the melt immediately, and is a tubular reactor connected to the melting device without of with passing through ductwork passing the melt. FIG. 1 illustrates the melting device A and the polycondensation reactor B connected to each other without any ductwork.

Figure 2:
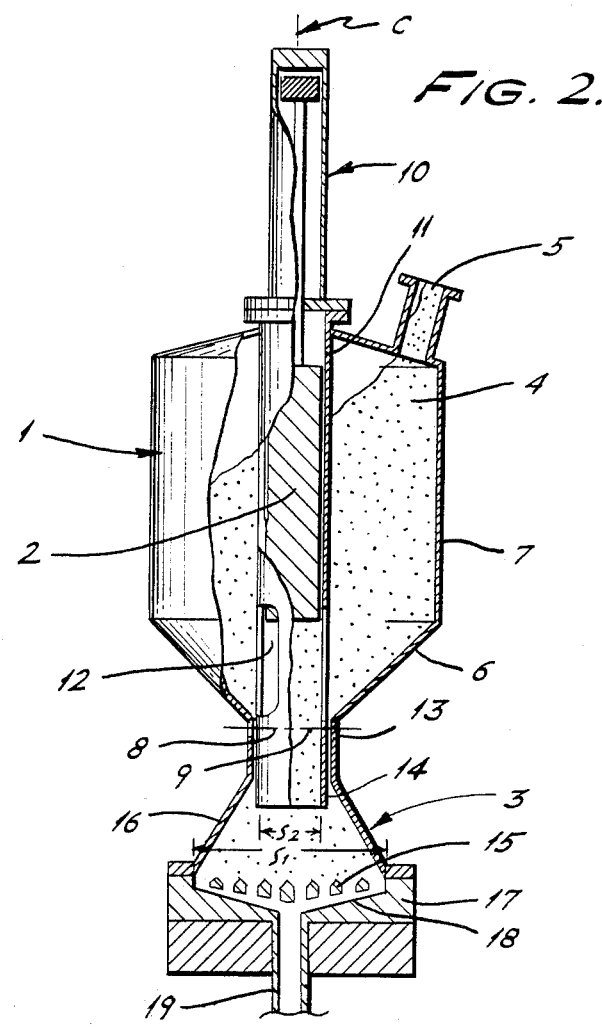
FIG. 2 is a longitudinal section of the melting device.

The melting device A has, as shown in FIG. 2, at least three elements, i.e., a container 1, a piston 2 and a melting chamber 3. The container 1 has an inlet 5 in its upper part for supplying a powder or granules 4 of ω-amino acid, and its lower part has a frusto-conical or pyramid-shape bottom portion 6 as an extension of a main body 7. A truncated portion 8 of the bottom portion 6 composes an outlet 9 for discharging the powder or granules 4 from the container 1. The piston 2 moves substantially vertically along the vertical center line C in the outlet 9. The vertical movement thereof is effected by any suitable means, preferably an air cylinder 10. The piston 2 is adapted to move vertically within a guide 11 in order to smooth the vertical movement thereof as well as realise the function thereof efficiently. The guide 11 preferably has the shape of a cylinder substantially equal in cross-sectional shape and size to the outlet 9. Intakes 12 for the powder or granules 4 are bored around the periphery of the guide 11 at the height of the bottom portion 6. If required, the guide 11 may also serve as a peripheral wall 13 of the outlet 9, or the guide 11 may constitute an elongated portion 14 of the outlet 9.

The melting chamber 3 is a chamber for melting the powder or granules which is provided below the outlet 9, continuous therewith, it has a cross-sectional area $S_1$ larger than the cross-sectional area $S_2$ of the outlet 9. In addition, the melting chamber 3 also contains a lattice-shaped hotplate 15. It must be noted that the cross-sectional area $S_1$ means the cross-sectional area at any vertical position between the outlet 9 and the hotplate 15. Accordingly, it is possible to say that an upper main body 16 of the melting chamber could have a frusto-conical shape. A lower main body 17 thereof, below the hotplate 15, is formed as a bottom portion 18 with a constricted structure in order to allow the melt to collect easily. Ductwork 19 is provided continuous with the bottom portion 18 and connected to a polycondensation reactor.

The method of the invention employing the above apparatus is carried out as follows.

The ω-amino acid which is the object of the invention is particles of a powder of granules of 11-aminoundecanoic acid and/or 12-aminododecanoic acid. The ω-amino acid is solid at ordinary temperature and is obtained industrially as a powder or granules. Amongst the various powders and granules available, the effects of the invention are realised better by employing peferably a powder having an average particle diameter of 0.05 to 4 mm.

The first operation of the invention is to envelop the powder or granules of ω-amino acid in an inert gas. In this case, "envelop" means that the particles of the powder or granules are placed in a chamber or container isolated from the atmosphere, the air in the container is expelled by means of the inert gas, and the air gaps between the particles of the powder or granules are filled with the inert gas so that the particles are in a chamber which is essentially free of air. Although this operation is possible within the container 1, the operation is preferably carried out in a separate container (not shown) before the ω-amino acid is supplied to the container 1. This is because, in the method of the invention, if the particles of powder or granules are supplied to the container 1 before being enveloped in the inert gas, it is impossible to expel the air thoroughly from the powder or granules to make the chamber essentially free of air, particularly from the air gaps between the particles, even if the melting operation described below is conducted simultaneously with the supply of inert gas, so that only a polyamide reduced in quality will be obtained.

The second operation of the invention is to melt the powder or granules enveloped in the inert gas without providing any liquid for the powder or granules. This is obtained by feeding the powder or granules 4 into the container 1 through the inlet 5 of the container 1 and forcing the powder or granules 4 filling the container 1 into the melting chamber 3 by the piston 2. The operation of forcing the powder or granules 4 into the melting chamber 3 is effected by moving the piston 2 vertically through the operation of the air cylinder 10 thereby reciprocally and repeatedly mechanically forcing a succession of the particles. When the piston 2 is moved upward, the particles of the powder or granules 4 enter the guide 11 through the intakes 12 bored in the lower part of the guide 11, and are then forced downward by the downward movement of the piston 2 and are thus supplied to the melting chamber 3 from the outlet 9. It must be noted that the supply of the powder or granules into the intake 12 is performed automatically, provided that the particles of the powder or granules fill the container 1, since the bottom portion 6 of the container 1 has a frusto-conical or pyramid shape.

Since the cross-sectional area $S_1$ of the melting chamber 3 is larger than the cross-sectional area $S_2$ of the outlet 9, the particles of the powder or granules in the outlet 9 are caused to flow through an expanding area extending from the inlet to the outlet of the melting container 3 and to fall naturally by an amount corresponding to the amount thereof melted by the lattice-shaped hotplate 15 in the melting chamber 3 and deposited on the hotplate 15. The deposits melt successively.

The melt of the powder or granules is collected in the bottom portion 18 and sent to the polycondensation reactor through the ductwork 19.

In the invention, the arrangement must be such that the melt reaches the polycondensation apparatus within 20 minutes, preferably within five minutes, after the melt is formed. This is because the ω-amino acids, which are an object of the invention, form polymers in the melting chamber through the progress of the polycondensation reaction if the above time elapses after melting, which makes it impossible to transfer the melt from the melting chamber to the polycondensation reactor. This phenomenon is not found in the conventional method wherein polymerization is performed with a liquid (water) accompanying the ω-amino acid, since the liquid suppresses the progress of the polymerization.

In the polycondensation reactor, the melt-polycondensation reaction is performed at between 220° to 290° C., preferably between 240° to 270° C. under a normal, increased or reduced pressure to obtain a polyamide. The polyamide is first formed into pellets by a known method, or is formed directly into a fibrous substance as an end product.

The following effects are offered by the method and apparatus in accordance with the present invention.

(1) The method of the present invention wherein a raw ω-amino acid material is melted directly and supplied to a polycondensation reactor without any liquid eliminates the need for removing the carrier liquid in the polycondensation reactor. Accordingly, the invention has the effect of allowing a reduction in the quantity of heat energy required by the polycondensation reactor.

(2) It is possible to prevent the clogging of the feed piping due to high viscosity resulting from the progress of the melt-polycondensation reaction which starts immediately after melting, by supplying the raw ω-amino acid material to the polycondensation reactor within 20 minutes after the ω-amino acid has melted. Accordingly, the invention has the effect of permitting the raw ω-amino acid material to be supplied continuously and stably to the polycondensation reactor.

(3) Employing the melting device in accordance with the invention enables the powder or granules of the raw ω-amino acid material to be melted and supplied continuously and stably to the polycondensation reactor.

EXAMPLE 1

After the air included in and between ω-aminododecanoic acid particles having an average particle diameter of 200 μm was replaced by a vacuum suction-nitrogen filling method, the ω-aminododecanoic acid was melted continuously at a melting rate of 30 kg/hr by the melting device shown in FIG. 2 and then supplied continuously to a cylindrical polycondensation reactor with a three-stage heating jacket having an inside diameter of 300 mm and a height of 3 m.

The temperature of the hotplate of the melting device was set at 230° C. The ω-aminododecanoic acid supplied by the cyclic vertical action of the piston was brought into contact with the hotplate lattice and heated so that it melted. The melt was supplied continuously to the polycondensation reactor within about 30 seconds. Upper, intermediate and lower stages of the heating jacket of the polycondensation reactor were maintained at 260° C., 250° C. and 240° C., respectively. The melt having undergone the polycondensation reaction was spun as a strand from the polycondensation reactor by a quantitative pump at a delivery rate of 27.3 kg/hr, and was then cooled in a cooling bath and cut by a cutter to become a pellet-like end product.

The operation of the apparatus was extremely stable. Even after approximately six months after start, both the melting device and the polycondensation reactor had no faults. Also the color tone of the pellets produced was excellent, and no foreign matter was found in the polymer.

EXAMPLE 2

(This example is meant to examine how soon after it starts to form the melt should be transferred to the polycondensation reactor.)

Figure 3:
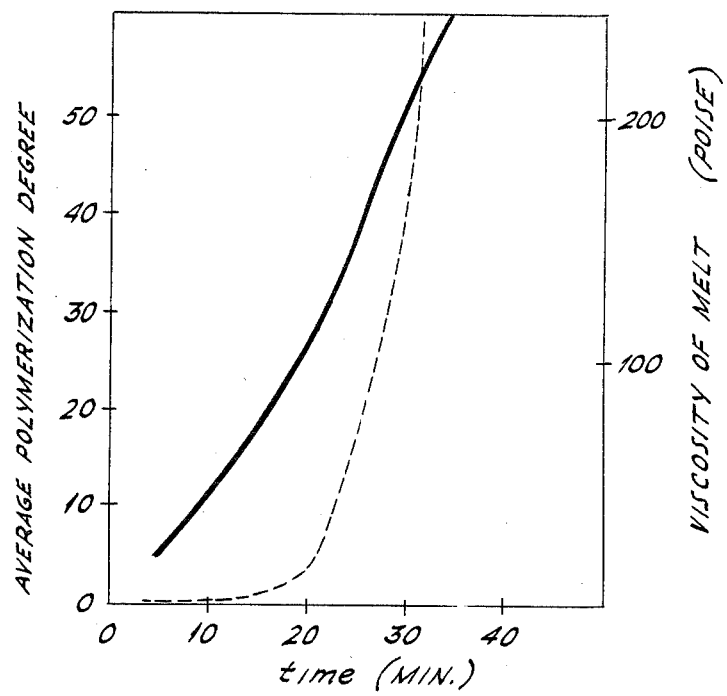
FIG. 3 is a graph showing how rapidly the powder or granules of ω-amino acid are polycondensed after being melted.

With a powdered $\omega$-aminoundecanoic acid having an average particle diameter of 200 μm employed as the raw material, $\omega$-aminoundecanoic acid was melted at 240° C. by employing the melting device described in the patent description. The lapse of time and the viscosity of the melt after melting were measured to obtain the results shown in the Table below and in FIG. 3.

When 20 minutes (the time after melting defined in one of the appended claims) had elapsed after the start of melting, the viscosity of the melt rose suddenly, making it difficult to supply the melt to the polycondensation reactor. The viscosity of the melt within 20 minutes after melting was sufficiently low for transferring the melt from the melting device to the polycondensation reactor; hence, it was possible to supply the melt stably and readily from the melting device to the polycondensation reactor.

TABLE

| Increase in viscosity of $\omega$-amino-undecanoic acid after melting (230° C.) | |
|---|---|
| Time after melting (min) | Viscosity of melt |
| 5 | 2.5 centipoise |
| 10 | 5 centipoise |
| 15 | 5 poise |
| 20 | 16 poise |
| 30 | 174 poise |

INDUSTRIAL APPLICABILITY

The invention is applicable to the polymerization of meltable higher aliphatic $\omega$-aminocarboxylic acids.

We claim:

1. A method for continuous polycondensation of a higher aliphatic $\omega$-amino acid which comprises:
   enveloping particles of at least an $\omega$-amino acid selected from the group consisting of 11-aminoundecanoic acid and 12-aminododecanoic acid in a gas which is inert with respect to said particles, placing the particles in a chamber which is essentially free of air,
   reciprocally and repeatedly mechanically forcing a succession of said particles from said chamber to a melting container located downstream of said chamber, without entraining any liquid with said particles,
   melting said particles in said melting container to obtain a melt of the $\omega$-amino acid,
   supplying the resulting melt to a tubular polycondensation reactor connected to receive the melt from the melting container, and
   heating the melt to produce nylon 11, nylon 12 or a copolymer thereof.

2. A method for continuous polycondensation of higher aliphatic $\omega$-amino acid according to claim 1, wherein the supplying of said melt is completed within about 20 minutes after the particles start to melt.

3. The method defined in claim 1, wherein the particles repeatedly mechanically forced from said chamber are caused to flow through an expanding area extending from the inlet to the outlet of said melting container.

* * * * *

UNITED STATES PATENT AND TRADEMARK OFFICE
CERTIFICATE OF CORRECTION

PATENT NO. : 4,546,171
DATED : October 8, 1985
INVENTOR(S) : Ezio Gotah, Takeshi Tomishima, Tadao Tsutsumi and Yoshiyuki Komuro It is certified that error appears in the above-identified patent and that said Letters Patent is hereby corrected as shown below:

Column 2, Lines 4 to 5, "and frustoconical" should read --and a frustoconical--

Column 2, line 38, "without of with" should read --without or with--

Signed and Sealed this

Twenty-third Day of September 1986

[SEAL]

Attest:

DONALD J. QUIGG

Attesting Officer

Commissioner of Patents and Trademarks